Patented Nov. 30, 1943

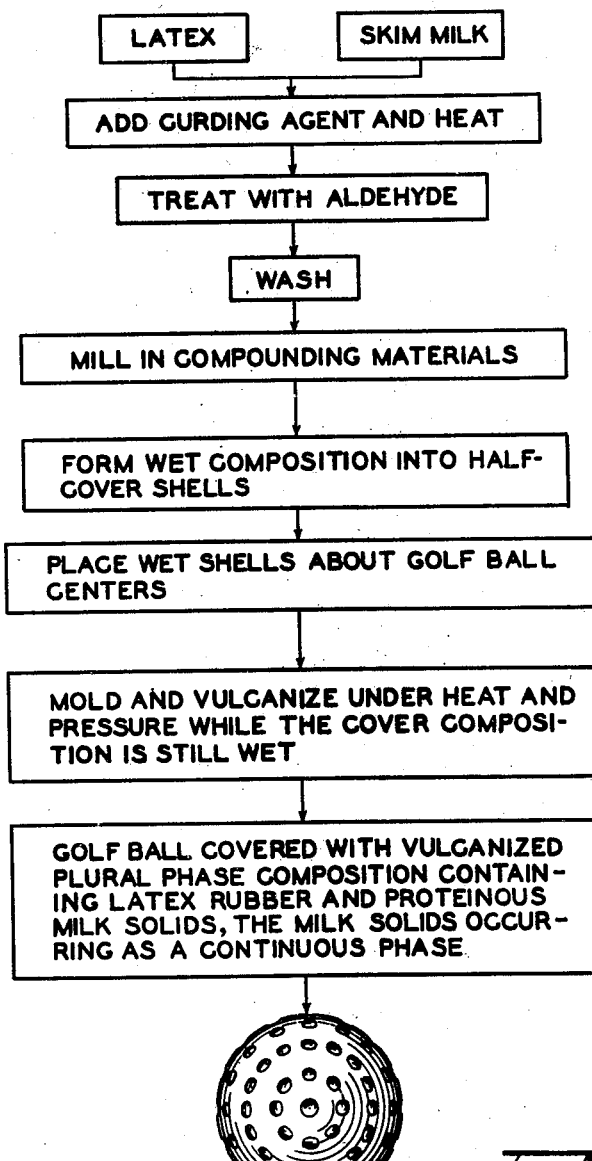

2,335,405

UNITED STATES PATENT OFFICE 2,335,405

TWO-PHASE COMPOSITION AND METHOD OF PREPARING THE SAME

William C. Geer, Ithaca, N. Y.

Application November 27, 1940, Serial No. 367,412

16 Claims. (Cl. 18—55)

This invention relates to certain plural-phase compositions containing rubber and proteinous milk solids in intimate admixture and to methods of preparing such compositions. In a preferred form of the invention, the proteinous milk solids occur as a continuous phase of the composition. Compositions of this preferred character are especially useful for golf ball covers and the invention accordingly contemplates a golf ball covered with such a composition as well as the methods employed in preparing the compositions and in providing golf balls with covers of the character indicated.

Heretofore, practically all golf balls made have been provided with molded covers of a composition consisting essentially of balata. Research workers associated with the golf ball industry as well as independent inventors have for many years attempted to devise a cheaper and better material for covering golf balls but, insofar as applicant is aware, these efforts have heretofore produced no material which even approaches, much less exceeds, balata compositions in general satisfaction.

I have discovered a new composition for covering golf balls and have succeeded in producing balls which not only are fully equal in all essential respects to balls covered with balata but which actually are superior to such balls in a number of important respects. The cost of my new composition appears to be as much as 60% less than the cost of compositions now used in covering high-grade, first quality balls. In driving tests, the flight of balls covered with the present composition frequently exceeded and practically always at least equalled the flight of high-grade balls having conventional covers. The present covers satisfactorily resist cutting by a topping blow and will not dent as do prior covers of the highest quality. Also, there is reason to believe that balls covered according to the present invention will show a better back spin on approach shots and will putt better. As will appear in greater detail later, excellent amalgamation of the cover with the rubber thread windings is obtained with the resultant production of a stable ball and better protection of the windings. The invention accordingly provides superior golf balls at substantially reduced costs.

The unusual properties of the cover stocks of this invention are obtained by utilizing proteinous materials in an exceptionally fine state of sub-division and mixing the finely divided proteinous materials with rubber by a process which causes the proteinous material to form a continuous phase in the composition. It is well known to mix proteinous materials such as casein with rubber in various forms and by a variety of procedures, but such prior practices have dispersed the casein in the rubber so that the casein occurs as a discontinuous phase of the composition, a condition just the reverse of that produced in the present invention. Such prior compositions are not satisfactory for covering golf balls.

Extensive investigations including selective staining tests for rubber and proteinous materials, stress-strain tests, and X-ray tests, have shown that the proteinous material does form a continuous phase of the present composition. It is believed that most, if not all, the proteinous material occurs in such continuous phase although it is conceivable that minor quantities may become dispersed in the rubber and such condition is not excluded. It is further believed that the proteinous material occurs in the composition in filamentary form and it probably exists as a filamentary network. The rubber may occur either in continuous or discontinuous phases but, in the preferred golf ball cover stocks, the rubber also probably exists as a separate continuous phase in the form of a filamentary network. In such cases, the two filamentary networks of rubber and proteinous material are mutually intertwined and interlocked, each exerting its characteristic effect more or less independently of the other and the two combining to produce the unique physical properties of the composition. Thus when a composition of this character is subjected to a stress-strain test, the sample elongates only slightly as the load is increased greatly until a rather sharp yield point is reached after which the elongation is much greater for the same or lesser increases in load. Quite differently, ordinary rubber compositions containing casein or the like dispersed in the rubber according to conventional methods show the usual rubber stress-strain characteristics including relatively high elongations at small loads and the absence of a definite yield point.

The manner in which rubber and finely divided proteinous material are mixed and the proteinous material is induced to form a continuous phase will appear from the following more detailed description of the invention.

Rubber is used in the form of liquid rubber latex, which is understood to include not only natural Hevea latex but all analogous aqueous dispersions of rubber whether naturally occurring or artificially prepared.

The proteinous material is obtained from milk as the proteins in milk occur in an exceptionally fine state of sub-division which has not been satisfactorily duplicated. Preferably, substantially all the butter fats are removed from the milk so that the remaining insoluble solid materials are essentially proteinous in nature. Ordinary high grade skim milk is a preferred material although evaporated milk and condensed milk may be used as all such milk products are rich in proteinous materials present in a fine state of sub-division.

In process, a milk product rich in proteins is mixed with rubber latex in proportions preferably corresponding to from 50 to 90 parts by weight of dried milk solids of a proteinous nature per 100 parts of rubber, dry weight. Superior golf ball covers are obtained if the proportions are from 65 to 75 parts of proteinous milk solids per 100 parts of rubber solids. When the latex and milk product have been thoroughly mixed by gentle stirring, the mixture is curded by adding a curding agent and, preferably, heating for a time until curding is complete and the curds have formed in fairly large lumps. Such heating is not absolutely essential and may be dispensed with in some instances. However, the heat digestion appears to facilitate the subsequent washing as well as the curding and is generally desirable. The curding agent may be any common acid or other material known to curd latex and milk, but preferably is a simple organic acid such as acetic acid. In a preferred procedure, the curded mixture then is treated with sufficient formaldehyde to insolubilize the milk proteins. The formaldehyde may be replaced by other aldehydes such as acetaldehyde, propionaldehyde, crotonaldehyde and the like, which insolubilize proteins. Also, other well-known insolubilizing agents such as aluminum chloride and zinc sulphate have been used instead of the aldehydes but, for some reason which has not been explained, such other agents produce results definitely inferior to those obtained with the aldehydes and especially formaldehyde. For best results, it is important that the formaldehyde be added after the curding although useful results may be obtained by reversing this procedure and adding the formaldehyde before the curding agent, especially if the temperature is raised to about 95° C. when the formaldehyde is added. If the formaldehyde treatment is omitted entirely, there is an undesirable tendency for the milk solids to separate out of the composition during the subsequent milling operation. After the formaldehyde treatment, the treated curds are filtered and washed thoroughly.

Without being dried other than superficially, as by squeezing to remove excess water, the wet curds are compacted in any conventional manner as by milling them on an ordinary two-roll rubber mill. After the mixture has formed a sheet on the mill, compounding ingredients necessary to vulcanize the rubber are added, with continued milling, as are any other desirable pigments, fillers, age-resisters, or other compounding ingredients. The compounded and still wet composition is then removed from the mill and heat-molded and vulcanized in the manner customarily followed. In making golf ball covers, the composition is first pressed into half-cover shells, two of the shells are placed about a wound golf ball center and the assembled ball is subjected to a heat molding and vulcanizing operation. The cover composition should still be wet, i. e. it should contain sufficient water to feel moist to touch, when the shells are molded about the balls. The present compositions may be molded and vulcanized at relatively low temperatures as from 160° to 220° F. with complete satisfaction, a factor of considerable importance in golf ball manufacture as higher temperatures tend to relax the tension in the wound threads and so lower the compression and flight distance of the finished ball. Also, the present composition flows about the rubber threads of the ball quite readily, even at the low temperatures employed for molding, and so effects excellent amalgamation of the cover with the windings.

The procedure outlined produces a cover exhibiting the desired phase relationships with the proteinous milk solids occurring principally if not entirely as a continuous phase. This condition is essential to a satisfactory golf ball cover and apparently is not obtained if the procedure is modified, either as to materials or sequence of operations, other than in the few respects hereinabove indicated.

The accompanying drawing sets out in flow sheet style the salient features of a preferred embodiment of the invention as applied to the covering of golf balls.

The foregoing procedure is further exemplified by the following detailed example of the invention in a preferred embodiment.

*Example 1.*—4000 c. c. of skim milk containing 120 grams of milk solids (principally proteinous materials and containing only negligible quantities of fats) are mixed with 282 grams of ammonia preserved, centrifugally concentrated Hevea latex (the standard approx. 60% latex of commerce) containing 171.5 grams of dry rubber solids. The latex and skim milk are mixed thoroughly by gentle stirring at room temperature. The mixture is then curded by adding an acetic acid solution containing 40 c. c. of glacial acetic acid in 200 c. c. of water and heating on a water bath at about 50° C. until curding is complete, which usually will require an hour to an hour and a half. 45 c. c. of a 40% formaldehyde solution in 100 c. c. water then are added and the mixture is further heated on the water bath at about 50° C. for an hour, the mixture being stirred several times during the hour to break up the curds somewhat and insure thorough intermixing with the formaldehyde. The curd is then collected on cheese cloth or otherwise filtered off and is thoroughly washed in running water until all the free acid has been removed. The curd is then squeezed in the cheese cloth to remove superficial water but is not otherwise dried.

The separated wet curd (in a typical case containing about 50% water by weight) is then placed directly on an ordinary two-roll rubber mill and subjected to continued milling with the rolls preferably heated to 150° to 160° F. until the curds form a sheet about the rolls and a bank between the rolls. The temperature of the rolls may then be lowered to normal by circulating cooling water through them. Milling is continued as compounding ingredients are added including 0.86 gram of diphenyl guanidine; 51.5 grams of titanium dioxide; 17.1 grams of zinc oxide; 5.1 grams of sulfur and 0.51 gram of zinc dibutyl dithiocarbamate. The diphenyl guanidine is added first and thoroughly mixed with the composition after which the rest of the ingredients are added, together or successively at will, with the exception of the zinc dibutyl dithiocarbamate which should be added last.

For convenience, the entire composition may be calculated on the basis of 100 parts of rubber as follows:

| | Parts by weight |
|---|---|
| Rubber (dry weight) | 100 |
| Proteinous milk solids | 70 |
| Titanium dioxide | 30 |
| Zinc oxide | 10 |
| Sulfur | 3 |
| Zinc dibutyl dithiocarbamate | 0.3 |
| Diphenyl guanidine | 0.5 |

When the batch is thoroughly mixed, it is removed from the mill in sheets all according to regular rubber factory practice. At this stage, the composition is still quite wet and moist to touch and, in a typical case, contains about 10% water.

The wet composition is then formed at once into half-cover shells as by placing an appropriately sized piece of the sheeted composition in a cold shell mold, placing the mold in a vulcaniziing press heated to 220° F., closing the press, and immediately turning cold water into the press to cool the shells. Even after this heat-molding operation, the shell is still wet and in typical cases contains from 3 to 5% water. The wet shells are then promptly placed about a wound golf ball center and the assembly is molded and the cover composition vulcanized in the usual manner by heating in a mold, as for ten minutes at 220° F. Some water remains in the composition even after the final vulcanization, but the composition will dry to a constant weight condition in about one to two weeks' storage under ordinary room conditions.

It is important that the cover composition be wet (moist to the touch) at the time the final molding and vulcanization is started. If too much water is lost during the preceding milling and molding operations, additional water should be added so that the molded shells will contain at least about 3% water at the time they are subjected to the final molding and vulcanizing operation. Otherwise the most desirable phase relationships are not obtained.

While compositions prepared according to the foregoing procedure are especially useful for golf ball covers, they are also well adapted for a variety of other uses where a tough, balata-like composition is of value, as for example, in the beads of automobile tires. Because the composition is handled while in a wet condition, it may be tubed, calendered, or otherwise processed without danger of scorching; a condition impossible with other compositions.

Where the tough balata-like characteristics of the foregoing compositions are not required but high abrasion resistance and high tear resistance are needed, a plural-phase composition having somewhat different characteristics may be prepared by a modified procedure which, however, embodies many of the novel aspects of the foregoing procedures. The modified procedure is illustrated by the following detailed example:

*Example 2.*—The basic recipe for the entire composition prepared in this example is

| | Parts by weight |
|---|---|
| Rubber (dry weight) | 100 |
| Proteinous milk solids | 30 |
| Zinc oxide | 5 |
| Sulfur | 3 |
| Mercapto benzothiazole | 0.8 |
| Tetramethyl thiuramdisulphide | 0.2 |

In the modified procedure, 328.4 grams of approximately 60% concentration ammonia-preserved, centrifugally concentrated Hevea latex (200 grams dry weight) are mixed with 2000 c. c. of skim milk containing about 60 grams dry weight of proteinous solids and only negligible amounts of fatty solids. The mixture is curded by adding an acetic acid solution containing 20 c. c. glacial acetic acid in 100 c. c. water, stirring, and preferably although not necessarily heating at 50° C. until a thick curd is formed. Then 22½ c. c. of 40% formaldehyde in 100 c. c. of water are added and the mixture is stirred intermittently and heated for about an hour at 50° C. The curd is then filtered as on a cheese cloth and washed free of acid. Thus far, the procedure is similar to that described in Example 1 and is subject to the same variations as those hereinabove indicated. However, wider variations in the relative proportion of milk solids are permissible and the proportions will generally be lower than in the preceding example and usually in the range of 5 to 50 parts of milk solids per 100 parts of rubber.

The washed curd is next dried, either at room temperature or in a low-temperature drying oven, until it is no longer wet but is dry to touch. At this stage, the milk solids still occur principally as a continuous phase. The dried curd then is milled on a rubber mill until it forms a coherent sheet, after which, the other compounding ingredients are added with continued milling. In the specific example, 10 grams zinc oxide, 6 grams sulfur, 1.6 grams mercaptobenzothiazole, and 0.4 gram of tetramethyl thiuramdisulphide are added. The mixed composition is then molded and vulcanized, for example, for 30 to 45 minutes at 340° F. as in regular rubber practice.

When the dry curd is milled until it forms a coherent sheet, the continuous phase of milk solids is broken up and dispersed in the rubber. Consequently, the product of the modified procedure of Example 2 contains insolubilized milk solids occurring as a discontinuous phase in a continuous phase of vulcanized rubber. For this reason, the product does not exhibit all the unusual properties of the product of Example 1, but because of the extremely fine state of subdivision of the insolubilized milk solids and the particular method by which the composition is prepared, the product exhibits unusual physical properties including excellent tear resistance and abrasion resistance. It is also resistant to staining. Such compositions are useful for making high quality shoe soling, for white sidewalls of automobile tires and for use as a masterbatch to be added to rubber compositions used for making inner tubes and other products to improve the tear resistance and abrasion resistance of the products.

In either of the foregoing examples, the properties of the compositions may be modified by replacing the latex in whole or in part with analagous aqueous dispersions of any of the synthetic rubbers such as polychloroprene or any of the various copolymers of butadiene with other materials including acrylonitrile, styrene or the methacrylates, or by adding to the mixture of any such latex and milk, prior to curding, aqueous dispersions of materials such as thermoprene and other rubber isomers, chlorinated rubber and other rubber derivatives, and similar materials. Similarly, a variety of other compounding ingredients may be added or substituted for the specific ingredients mentioned and details of the procedure may be varied unless

I claim:

1. The method of covering golf ball centers which comprises mixing skim milk and rubber latex in proportions corresponding to from 50 to 90 parts by weight of dried proteinous solids per 100 parts of rubber solids, curding the mixture by adding a curding agent and heating, insolubilizing at least a portion of the milk solids by treating the curded material with an aldehyde, washing the treated curds, milling the washed curds while they are still in a wet condition, adding compounding ingredients in the course of the milling to form a compounded wet material, forming the compounded wet material into wet cover shells and, while the shells are still wet, molding and vulcanizing them about the golf ball centers.

2. The method of covering golf ball centers which comprises mixing skim milk and rubber latex in proportions corresponding to from 50 to 90 parts by weight of proteinous milk solids per 100 parts of rubber solids, curding the mixture, insolubilizing at least a portion of the milk solids by treating the curded material with an insolubilizing agent, washing the treated curds, milling the washed curds while they are still in a wet condition, adding compounding ingredients in the course of the milling to form a compounded wet material, forming the compounded wet material into wet cover shells and, while the shells are still wet, moding and vulcanizing them about the golf ball centers.

3. The method of covering golf ball centers which comprises mixing rubber latex and a liquid milk product rich in proteinous material, the latex and the liquid milk product being mixed in proportions corresponding to from 50 to 90 parts by weight of proteinous milk solids per 100 parts of rubber solids, curding the mixture, washing the curds, milling the washed curds while they are still in a wet condition to form a compacted wet material and, while the compacted material is still in a wet condition, molding and vulcanizing it about the golf ball centers.

4. The method of covering golf ball centers which comprises mixing rubber latex and a liquid milk product rich in proteinous material, the latex and the liquid milk product being mixed in proportions corresponding to from 50 to 90 parts by weight of proteinous milk solids per 100 parts of rubber solids, curding the mixture, separating the curds, compacting the separated curds while they are still in a wet condition, and molding and vulcanizing the still wet compacted material about the golf ball centers.

5. The method of covering golf ball centers which comprises mixing skim milk and latex in proportions corresponding to from 50 to 90 parts of proteinous milk solids per 100 parts of rubber solids, curding the mixture by adding an acid thereto, washing the curds, milling the washed curds while they are still in a wet condition, adding compounding ingredients in the course of the milling to form a compounded wet sheet, forming the compounded wet sheet into wet cover shells and, while the shells are still wet, molding and vulcanizing them about golf ball centers.

6. The method of preparing a plural-phase composition comprising rubber and milk solids with the milk solids occurring as a continuous phase of the composition, which comprises mixing skim milk and rubber latex in proportions corresponding to from 50 to 90 parts by weight of proteinous milk solids per 100 parts of rubber solids, curding the mixture by adding a curding agent and heating, insolubilizing at least a portion of the milk solids by treating the curded material with an aldehyde, washing the treated curds, milling the washed curds while they are still in a wet condition, adding a compounding ingredient in the course of the milling to form a compounded wet material, applying heat and molding pressure to mold and vulcanize the material while it is still in a wet condition.

7. The method of preparing a plural-phase composition comprising rubber and milk solids with the milk solids occurring as a continuous phase of the composition which comprises mixing rubber latex and a liquid milk product rich in proteinous material, the latex and liquid milk product being mixed in proportions corresponding to from 50 to 90 parts by weight of proteinous milk solids per 100 parts of rubber solids, curding the mixture, insolubilizing at least a portion of the milk solids by treating them with an aldehyde, washing the curds, milling the washed curds while they are still in a wet condition, applying heat and molding pressure to mold and vulcanize the milled material while it is still in a wet condition.

8. The method of preparing a plural-phase composition comprising rubber and milk solids with the milk solids occurring as a continuous phase of the composition which comprises mixing rubber latex and a liquid milk product rich in proteinous material, the latex and liquid milk product being mixed in proportions corresponding to from 50 to 90 parts by weight of proteinous milk solids per 100 parts of rubber solids, curding the mixture, separating the curds, and applying heat and molding pressure to the separated curds, the process being carried out without drying the material and so that the separated curds at the time of initiating the heat-molding retain at least enough water to feel moist.

9. An article of manufacture including a tough balata-like portion prepared according to the method of claim 8 and comprising a plural-phase composition containing vulcanized rubber and milk solids in substantially the proportions 50 to 90 parts by weight of proteinous milk solids per 100 parts of rubber, the milk solids occurring as a continuous phase of the composition.

10. An article of manufacture including a tough balata-like portion prepared according to the method of claim 7 and comprising a plural-phase composition containing 100 parts by weight of vulcanized rubber and substantially from 50 to 90 parts of milk solids consisting principally of proteinous material in an insolubilized state, the insolubilized proteinous material occurring as a continuous phase of the composition.

11. A golf ball having a tough, balata-like cover comprising a plural-phase composition containing vulcanized rubber and milk solids, the milk solids occurring as a continuous phase of the composition.

12. A golf ball having a tough, balata-like cover comprising a plural-phase composition containing vulcanized rubber and milk solids consisting principally of proteinous material, the milk solids occurring as a continuous phase of the composition.

13. A golf ball having a molded cover comprising a plural-phase composition containing vulcanized rubber and milk solids in a quantity corresponding to 50 to 90 parts by weight of milk solids per 100 parts of rubber, the milk solids occurring as a continuous phase of the composition.

14. A golf ball having a molded cover comprising a plural-phase composition containing vulcanized rubber and milk solids consisting principally of proteinous material in a quantity corresponding to 50 to 90 parts by weight of proteinous milk solids per 100 parts of rubber, the milk solids occurring as a continuous phase of the composition.

15. A golf ball having a tough, balata-like cover comprising a plural-phase composition containing vulcanized rubber and insolubilized milk solids consisting principally of proteinous material, the insolubilized milk solids occurring as a continuous phase of the composition.

16. A golf ball having a molded cover comprising a plural-phase composition containing vulcanized rubber and insolubilized milk solids consisting principally of proteinous material in a quantity corresponding to 65 to 75 parts by weight of milk solids per 100 parts of rubber, the insolubilized milk solids occurring as a continuous phase of the composition.

WILLIAM C. GEER.

CERTIFICATE OF CORRECTION.

Patent No. 2,335,405. November 30, 1943.

WILLIAM C. GEER.

It is hereby certified that error appears in the printed specification of the above numbered patent requiring correction as follows: Page 2, first column, line 12, for the words "In process" read --In the process--; page 3, first column, line 21-22, for "vulcaniziing" read --vulcanizing--; page 3, second column, line 37, for "340° F." read --240° F.--; page 4, first column, line 8, claim 1, for "dried proteinous" read --protenious milk--; line 43, claim 2, for "moding" read --molding--; and second column, lines 10 and 26, claims 6 and 7 respectively, before "applying" insert --and--; line 49, claim 9, before "milk" insert --proteinous--; and that the said Letters Patent should be read with this correction therein that the same may conform to the record of the case in the Patent Office.

Signed and sealed this 15th day of February, A. D. 1944.

(Seal)

Henry Van Arsdale,
Acting Commissioner of Patents.